United States Patent [19]

Weston

[11] 4,425,309
[45] Jan. 10, 1984

[54] PRODUCTION OF A PURIFIED ALUMINA-SILICA PRODUCT AND SUBSTANTIALLY PURE ALUMINUM TRICHLORIDE FROM BAUXITES AND CLAYS

[76] Inventor: David Weston, 34 Parkwood Ave., Toronto, Ontario, Canada, M4V 2X1

[21] Appl. No.: 426,264

[22] Filed: Sep. 29, 1982

Related U.S. Application Data

[63] Continuation-in-part of Ser. No. 377,992, May 13, 1982.

[51] Int. Cl.³ ............................. C01F 7/02; C01F 7/56
[52] U.S. Cl. ........................... 423/136; 423/133; 423/135; 423/76; 423/79; 423/80; 423/149; 423/343
[58] Field of Search ............... 423/133, 135, 136, 149, 423/415 A; 75/68 R, 68 A, 112, 113

[56] References Cited

U.S. PATENT DOCUMENTS

| 902,255 | 10/1908 | Saunders et al. | 423/135 |
|---|---|---|---|
| 1,147,832 | 7/1915 | Kugelgen et al. | 423/136 |
| 1,858,272 | 5/1932 | Jenness | 423/135 |
| 3,704,113 | 11/1972 | Hildreth | 75/112 |
| 3,793,003 | 2/1974 | Othmer | 423/136 |
| 3,816,093 | 6/1974 | Hildreth | 75/112 |
| 3,853,541 | 12/1974 | Othmer | 423/136 |
| 3,856,508 | 12/1974 | Othmer | 423/136 |
| 4,277,446 | 7/1981 | Weston | 423/135 |
| 4,288,414 | 9/1981 | Reynolds et al. | 423/135 |
| 4,355,007 | 10/1982 | Dunn | 423/135 |

FOREIGN PATENT DOCUMENTS

| 569830 | 2/1959 | Canada | 423/133 |
|---|---|---|---|
| 305578 | 9/1929 | United Kingdom | 423/136 |

Primary Examiner—Herbert T. Carter
Attorney, Agent, or Firm—Shoemaker and Mattare, Ltd.

[57] ABSTRACT

At least a single stage chlorination system for the production of a substantially iron-free alumina-silica product from Bauxites, Bauxitic Clays and Clays wherein at least one chlorination agent is selected from the group consisting of $Cl_2$, HCl and $COCl_2$ and at least one chlorination agent from the group consisting of $AlCl_3$ and $SiCl_4$.

10 Claims, 2 Drawing Figures

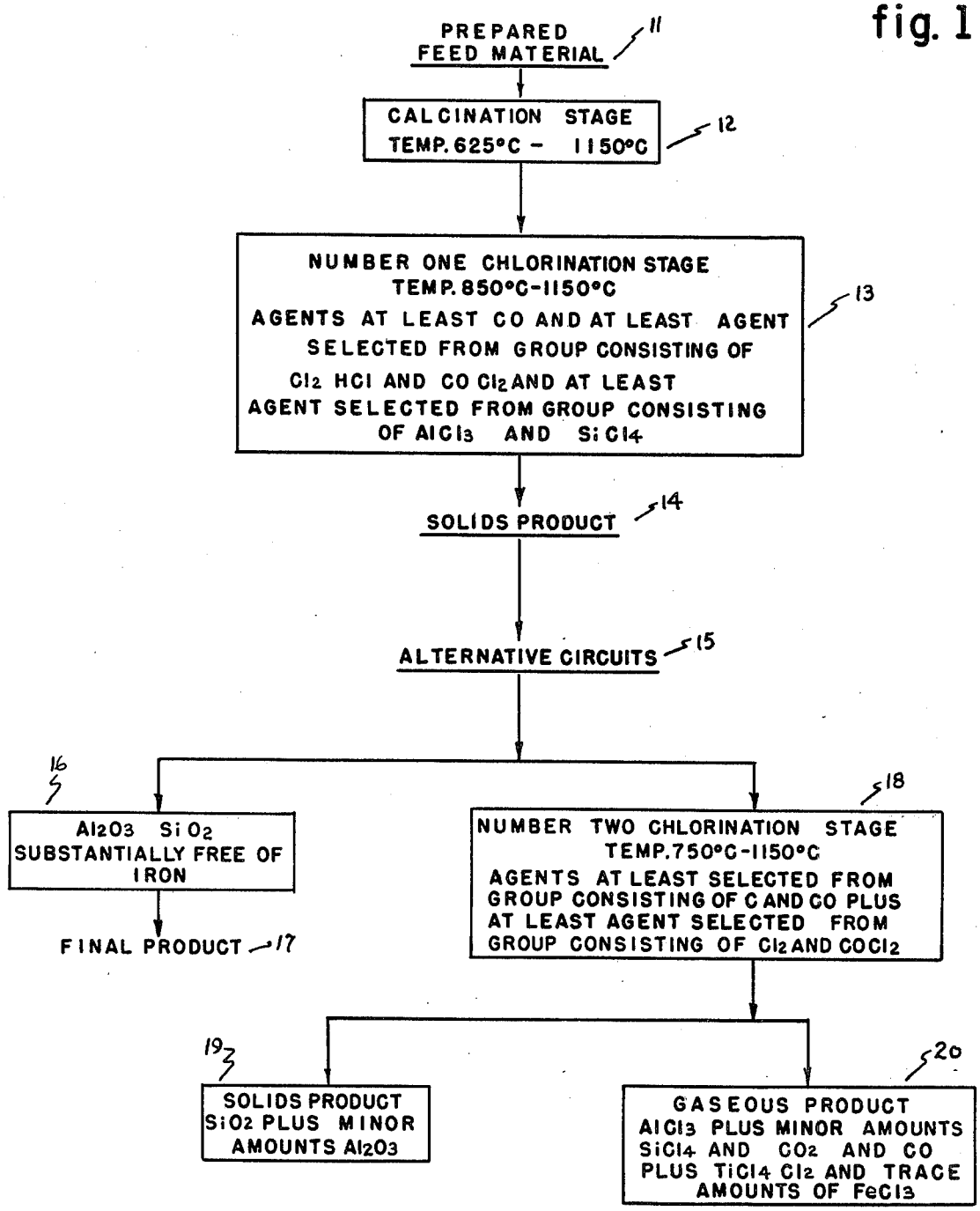

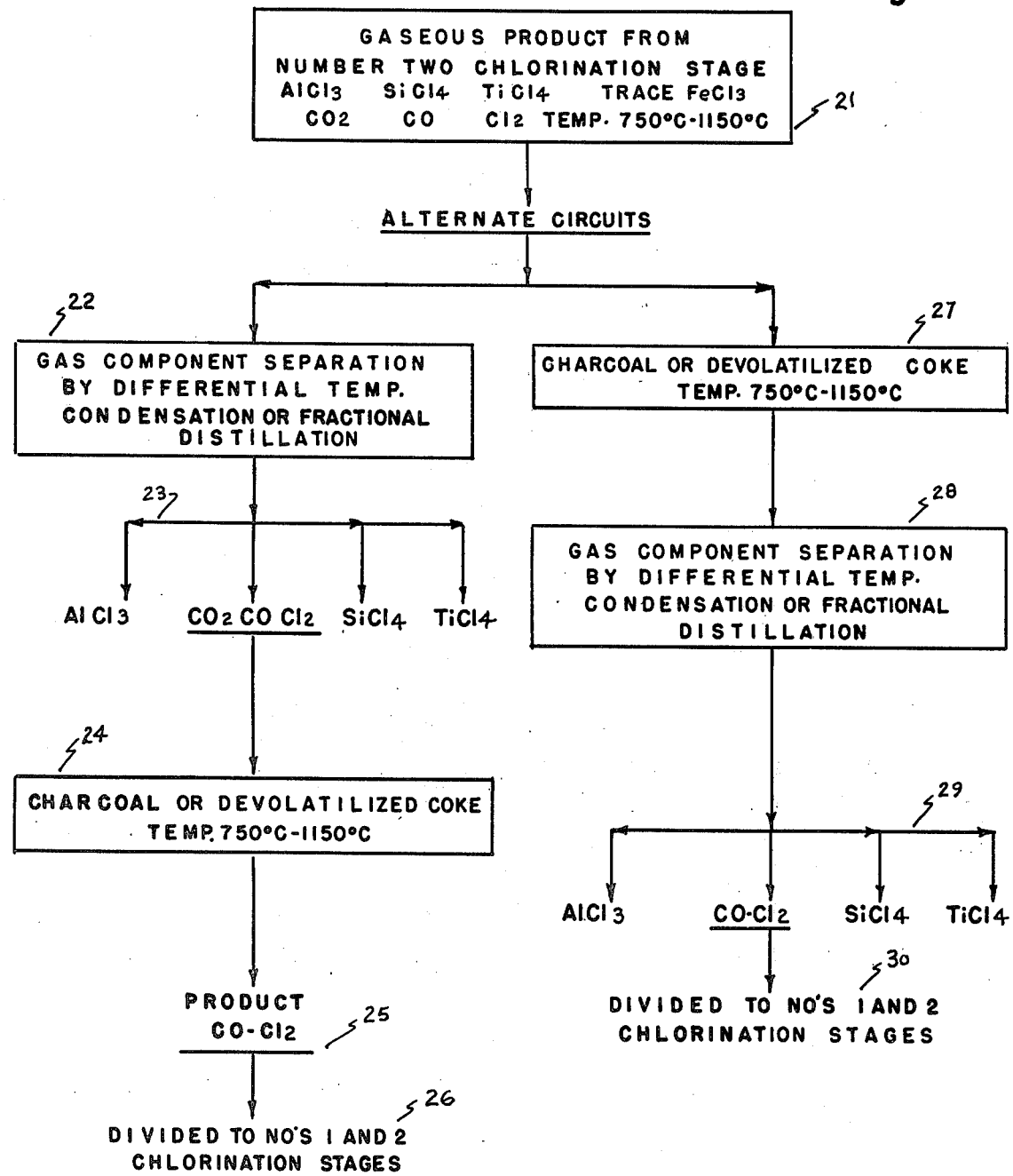

PRODUCTION OF A PURIFIED ALUMINA-SILICA PRODUCT AND SUBSTANTIALLY PURE ALUMINUM TRICHLORIDE FROM BAUXITES AND CLAYS

BACKGROUND OF THE INVENTION

This invention is a continuation-in-part of U.S. patent application Ser. No. 377,992 filed May 13, 1982.

The invention is primarily applicable to materials such as Bauxites and Clays that have present as major impurities iron and titanium in various mineral forms.

There has been a great deal of research and there is a vast quantity of literature in attempts to produce a relatively iron-free alumina, alumina-silica product and aluminum chloride from such raw materials as Bauxites and Clays. None of the processes proposed have been shown to be economically successful.

This problem can best be described by the following references: Landsberg "Chlorination Kinetics of Aluminum Bearing Minerals: Metallurgical Transactions B, Volume 6B, June 1975; pps. 207–208."

"Whereas Foley and Tittle showed that iron could be removed from pre-reduced bauxite by chlorination to produce a refractory grade alumina, FIG. 2 indicates that a substantial loss of alumina accompanies the initial rapid iron chlorination under reducing conditions. Even if this loss could be tolerated the remaining iron is too high for producing cell grade alumina or aluminum chloride."

U.S. Pat. No. 3,842,163, A. S. RUSSELL ET AL, entitled "Production of Aluminum Chloride" and assignors to Aluminum Company of America, state, to quote lines 45 to 58:

"In general, the reduction of aluminum-containing materials with chlorine in the presence of reducing carbon in some form to produce aluminum chloride is an old and generally well-known reaction and one of the suggested expedients referred to above utilized Bauxite as the alumina containing material. Bauxite however, normally contains many impurities including iron oxide, silica, and titania. Since these impurities readily react with chlorine in the presence of carbon to form iron, silicon, and titanium chlorides, the usual gaseous aluminum chloride reaction effluent therefrom must be subjected to cumbersome and expensive after-purification measues if these chloride contaminants are to be separated to provide even a reasonably pure aluminum product."

The U.S. Department of the Interior, Information Circular 1412 by Robert L. de Beauchamp, sums up the problem of producing $AlCl_3$ from various materials on page 6, the last paragraph reading as follows:

"The raw materials that may be used for the preparation of $AlCl_3$, include bauxite, clays, shale, anorthosite, coal ash, and many other aluminum containing materials. Bauxite or clays are the most logical choices because of their higher $Al_2O_3$ contents and the large reserves of these materials available. Iron is the impurity most deleterious to the process since it uses up chlorine and is difficult to remove from the product."

Canadian Pat. No. 569,830 to Groth in 1939 described a method for chlorinating aluminiferous materials by treating dehydrated and crushed raw materials with aluminum chloride vapor at 600° C.–900° C., removing hot reaction gases containing iron chloride and titanium chloride, treating the residue with chlorine and a reducing agent, and processing the recovered aluminum chloride vapor containing silicon chloride and carbon monoxide at temperatures above 800° C. with alumina or aluminiferous materials free from iron and titanium. The gases recovered from the chlorination process are oxidized to convert at least the chlorides or iron and titanium to their oxides prior to condensation. Therefore, because of the oxidation step, chlorides of the materials are not recovered in reusable form. Further, the vapor mixture recovered cannot be filuted with CO in order that the oxidation stage can be carried out.

Groth Column 1, lines 28 to 32 states:

"It is true that when processing between 900° C.–1150° C. titanium is removed from the original material along with the iron in the form of titanium tetrachloride, but only in small amounts unless a large excess of aluminum chloride is used."

Weston, U.S. Pat. No. 4,277,446, in the first chlorination stage, depends upon the use of excess aluminum chloride containing $FeCl_3$ that is recovered from the circuit and returned to chlorinate the $Fe_2O_3$. To quote, Column 8, lines 30–34:

"(b) Excess $AlCl_3$ that is used is recovered at a low cost as an impure $AlCl_3$ containing $FeCl_3$ and returned to the Number One Chlorination Stage without any deleterious effects on chlorinating the contained iron and titanium minerals."

Most surprisingly I have found that with the present invention the removal of the $Fe_2O_3$ from the raw material is far more effective than from either the teachings of Groth or Weston and in effect, as shown in the examples, has been reduced to a level which to the inventor's knowledge, has never been achieved heretofore by differential chlorination.

SUMMARY OF THE INVENTION

It is accordingly a primary object of the present invention to provide a novel and low cost process for the production of aluminum-silicon products substantially free of iron.

A further object of the present invention is to provide a novel and low cost process for the production of a substantially pure aluminum trichloride from Bauxites and Clays wherein the iron has previously been removed from the raw materials prior to mass chlorination with $Cl_2$ or $COCl_2$ to produce aluminum trichloride.

In satisfaction of the foregoing objects and advantages there is presented by this invention in its broadest concept a process for the production of a substantially iron free alumina-silica product, and substantially pure aluminum trichloride from various materials containing aluminum in the form of aluminum oxide minerals and complex aluminum minerals such as Kaolinite, that is $Al_2O_3 \cdot 2SiO_2 \cdot 2H_2O$, the process comprising:

(a) Calcining the feed material prior to the first chlorination stage to remove free and chemically combined water, and where such minerals as Kaolinite are present to break the chemical bond of $Al_2O_3$, $SiO_2$, and $H_2O$, driving off the $H_2O$ as water vapor and forming amorphous $Al_2O_3$ and amorphous $SiO_2$, which products respond differentially to chlorination treatment.

(b) Number One Chlorination Stage in which the agents are at least CO and at least agent selected from the group consisting of $Cl_2$, $COCl_2$ and HCl and at least agent selected from the group consisting of $SiCl_4$ and $AlCl_3$.

Most surprisingly, I have found that by the use of minor or starvation quantities of these groups of agents in a first chlorination stage at least 95% of the contained iron in the raw material can be differentially chlorinated. The temperature in this Number One Chlorination Stage is about 750° C. to about 1150° C.

The end solids product from this Number One Chlorination Stage will be $Al_2O_3$ and $SiO_2$ substantially free of $Fe_2O_3$ and highly desirous by the refractories industry.

(c) This end solids product may be further treated in a Number Two Chlorination Stage to produce a substantially iron free $AlCl_3$ by means well known to the Art using at least chlorination agents selected from the group consisting of $Cl_2$ and $COCl_2$, and reducing agents selected from the group consisting of C. and CO. The $AlCl_3$ is feed stock to the fused salt electrolytic cell for the production of aluminum metal.

If the contained iron in the feed material to the process is not removed prior to this Number Two Chlorination Stage normally a substantial portion of it will chlorinate under the Number Two Chlorination Stage conditions and finally report in the aluminum metal produced which is unacceptable in the production of a relatively pure aluminum metal. All of the steps described beginning with the Calcination Stage may be carried out in fluo-solids reactors well known in the Art.

The following will define for clarity various terms used in describing the invention:

Calcination—also known as dehydration—this terminology as used in this application means the following:
  (a) Removal of any free moisture as steam.
  (b) Breaking down of the bond of water of crystallization in aluminum oxide minerals having the chemical analysis of $Al_2O_3xH_2O$, wherein a high percentage of water of crystallization is driven off as steam.
  (c) Breaking down of the chemical bond or bonds of complex aluminum minerals such as kaolinite, $Al_2O_3.2SiO_2.2H_2O$, wherein the $H_2O$ is driven off as steam and the $Al_2O_3$ and $SiO_2$ are converted into amorphous $Al_2O_3$ and amorphous $SiO_2$ respectively. To accomplish satisfactory calcination of Bauxites and Clays, a temperature range of 625° C. to about 1100° C. may be used. It will be appreciated that the effectiveness of the calcination step is a primary function of temperature and time, the economic optimum being readily determined by anyone skilled in the Art.

This stage of the process uses conventional equipment well known in the Art, and consists of such equipment as horizontal rotary kilns, vertical shaft furnaces, and fluo-solids reactors with their auxiliary gas scrubbers and dust collection units.

Clays—generally refer to materials containing little or no $Al_2O_3.xH_2O$ minerals and the major aluminum mineral component is essentially Kaolinite.

Iron and Titanium—the standard practice of the aluminum industry is to report Fe and Ti analyses as $Fe_2O_3$ and $TiO_2$. The iron and titanium minerals contained in the aluminum bearing materials vary considerably and are but rarely only in the form of $Fe_2O_3$ and $TiO_2$. For instance the major iron mineral in Arkansas Bauxite is siderite, $FeCO_3$, and the commonest occuring form of titanium is as ilmenite, $FeOTiO_2$. When I refer to percentages of $Fe_2O_3$ and $TiO_2$ herein, I mean the chemical analyses of Fe and Ti converted to $Fe_2O_3$ and $TiO_2$ respectively.

Carbon—any form of carbon that can be used in specific stages of the process of the invention as a reducing agent for the contained metallic oxides in the raw material used in the process herein described, and that will not introduce added impurities that may have a major detrimental effect on the final desired product.

Examples of such carbon are charcoal, devolatilized coal coke, and devolatilized petroleum coke. The type of coke used should be carefully selected to avoid introducing comparatively large quantities of impurities that may have a major detrimental effect in the process to produce pure aluminum trichloride.

Devolatilization—refers to solid fuels such as coal or petroleum coke wherein the specific material has been heated to a sufficiently high temperature to drive off substantially all of the contained water as water vapor and any free hydrogen contained in the raw material.

Neutral conditions—where there is just sufficient free oxygen to meet the needs of the reaction.

Oxidizing conditions—where there is an excess of free oxygen to meet the needs of the reaction and free oxygen present at the end of the particular stage.

Reducing conditions—where there is an excess of free carbon, CO, $H_2$, or CH radical present to meet the needs of the reaction.

BRIEF DESCRIPTION OF THE DRAWINGS

Reference is now made to the drawings accompanying the application where it will be seen that FIG. 1 shows a preferred flowsheet of the invention for the production of an alumina-silica product substantially free of iron and the further treatment of this product to produce aluminum trichloride substantially free of ferric chloride and as feed stock for the production of substantially pure aluminum metal.

FIG. 2 shows a preferred flowsheet of the invention treating the gaseous product produced by Number Two Chlorination Stage by passing the gaseous product through a charcoal or devolatized coke bed to convert the contained $CO_2$ to CO.

The gas stream containing the CO, and after removal of the aluminum chloride, (not shown) is preferably cycled to the numbers one and two chlorination stages.

DETAILED DESCRIPTION OF THE DRAWINGS

FIG. 1 shows a preferred flowsheet of the invention. The prepared feed material shown at 11 may have been pretreated by magnetic cobbing to remove part of the $Fe_2O_3$ and where present ilmenite and biotite mica. Where ultra fines are present the feed material may have been granulated or pelletized by conventional means to prevent losses in the gas streams during calcination or chlorination particularly when using fluo-solids reactors.

The feed material is fed to the Calcining Stage 12 to remove free moisture and water of crystallization. The equipment is conventional (not shown) consisting of such units as horizontal kilns, shaft furnaces, and fluo-solids reactors. In the calcination stage 12 and in the at least two chlorination stages shown at 13 and 18 my preferred equipment (not shown) is fluo-solids reactors. From the Calcination Stage the material is fed to the Number One Chlorination Stage shown at 13. In this stage as much as 98% of the $Fe_2O_3$ in the material is differentially chlorinated with but minor to negligible amounts of the contained $Al_2O_3$. The solids product from the Number One Chlorination Stage is fed to the Number Two Chlorination Stage shown at 18 wherein the solids product shown at 16, normally analyzes less than 0.03% $Fe_2O_3$, which is an unheard of purity for use in the refractory industry where the limiting $Fe_2O_3$ specification is of utmost importance.

Where it is desirous to produce an aluminum chloride product substantially free of iron the solids product 14 is fed to the Number Two Chlorination Stage shown at 18. This stage involves mass chlorination of the contained alumina normally using large concentrations of $Cl_2$ either as $Cl_2$ or $COCl_2$ and in the presence of reducing agents preferably selected from the group consisting of C. and CO.

The solids product shown at 19 consists of amorphous silica and minor amounts of alumina and is either a waste product or maybe marketed as, primarily, filler.

The gaseous product shown at 20 will contain the desired aluminum chloride plus minor amounts of $SiCl_4$, $TiCl_4$, $Cl_2$, $CO_2$ and CO, and trace amounts of $FeCl_3$.

As the volatilization temperatures of the $AlCl_3$, $SiCl_4$ and $TiCl_4$ are 183° C., 59° C. and 137° C. respectively there is no problem in their separation from each other and from the $CO_2$, CO and $Cl_2$.

The $FeCl_3$ has a vapor solubility in the $AlCl_3$ and thus it is of the utmost importance to reduce the $Fe_2O_3$ in the feed material to the Number Two Chlorination Stage to the lowest possible level which in the invention has been demonstrated to be less than 0.02% or in excess of 98% of the original $Fe_2O_3$ contained in the feed material.

FIG. 2 shows a preferred flowsheet of the invention treating the gaseous product from Number Two Chlorination Stage. The gaseous product shown at 21 is passed through one or more beds of charcoal or devolatilized coke shown at 27 to convert $CO_2$ contained in the gas stream to CO. The gas stream discharging from the treatment stage is either treated by differential temperature condensation or fractional distillation or a combination of the two as shown at 29, and well known to the Art, to produce as shown at 29 substantially pure $AlCl_3$, which is a saleable product in itself or may be fed to a fused salt electrolytic bath to produce aluminum metal and the contained chlorine released and returned to the Number Two Chlorination Stage. In addition the $SiCl_4$ may be sold as a commercial product with at least part cycled to the Numbers One or Two or both Chlorination Stages. The $TiCl_4$ can be converted to either titania or titanium metal. The CO and $Cl_2$ remaining in the gas stream are preferably cycled to Numbers One and Two Chlorination Stages.

An alternate circuit shown at 22 to 26 separates the $AlCl_3$, $SiCl_4$ and $TiCl_4$ from the $CO_2$, CO, and $Cl_2$ prior to conversion of the $CO_2$ to CO. In a preferred embodiment (not shown) the $SiCl_4$ is retained in the gas stream with the CO and $Cl_2$ thus supplying the requisite $SiCl_4$ to the Number One Chlorination Stage.

EXAMPLES OF THE INVENTION

The following examples of the invention were carried out on a bulk sample of Kaolinitic Clay from a deposit located in the south eastern United States of America.

The sample as received was magnetically cobbed in a Colburne laboratory high intensity magnetic laboratory unit, dried to approximately 5% free moisture, crushed, put through a rolls and screened at 8 to 18 mesh and 65 or 100 mesh to produce a product that was essentially minus 8 plus 100 U.S. Standard. This product was calcined at 700° C. to 750° C., and after calcination was the feed material to the following examples except where otherwise noted.

The chemical analysis of the calcined product was as follows:

| $Al_2O_3$ | $SiO_2$ | $Fe_2O_3$ | $TiO_2$ | L.O.I. |
|---|---|---|---|---|
| 44.0 | 51.5 | 1.27 | 2.77 | 0.3 |

All of the examples were carried out in a 2½ inch fluo-solids reactor using batch charges of 250 grams.

The total gas volume used in all tests was kept reasonably constant at 5.0 liters per minute calculated at 21.1° C., and adjusted to the 5.0 liters with CO.

EXAMPLE 1

The following were conditions of this example:
Temperature in Number One Chlorination Stage, 913° C.
Agents used:
 1.5 gms/min. HCl and
 1.0 gms/min. $SiCl_4$ and make-up of gas stream to approximately 5.0 liters/min. with CO.
Treatment time: 25 mins.
At the end of the 25 minute treatment of the solids feed the residual solids product analyzed 0.016% $Fe_2O_3$. This analysis shows that 98.7% of the $Fe_2O_3$ in the feed material was chlorinated to produce a substantially iron free alumina silica product.

This was an amazing result from the use of starvation quantities of HCl and $SiCl_4$ and the short duration of the differential chlorination treatment. The alumina-silica product is outstanding in the low iron content for refractories and alternately in the production of aluminum chloride using the previously described number two mass chlorination stage would produce a substantially iron-free aluminum chloride product suitable for the production of aluminum metal.

EXAMPLE 2

The following were conditions of this example:
Temperature in Number One Chlorination Stage, 925° C.
Agents used: 0.6 gms/min. HCl, 0.2 gms/min. $Cl_2$, 0.8 gms/min. $SiCl_4$ and make-up of gas stream to approximately 5.0 liters/min. with CO.
Treatment time: 30 mins.
At the end of the 30 minute treatment of the solids feed the residual solids product analyzed 0.029% $Fe_2O_3$.

This analysis shows that 97.7% of the $Fe_2O_3$ in the feed material was chlorinated to produce a substantially iron-free alumina-silica product.

EXAMPLE 3

The following were conditions of this example:
Temperature in Number One Chlorination Stage, 925° C.
Agents used: 0.8 gms/min. HCl, 1.0 gms/min. SiCl$_4$, 6.0 gms/min. AlCl$_3$ and make-up of gas stream to approximately 5.0 liters/min. with CO.
Treatment time: 30 mins.

At the end of the 30 minutes treatment of the solids feed the residual solids analyzed 0.027% Fe$_2$O$_3$. This analysis shows that 97.9% of the Fe$_2$O$_3$ in the feed material was chlorinated to produce a substantially iron-free alumina-silica product.

The invention has been described herein with reference to certain preferred embodiments. However, as obvious variations thereon will become apparent to those skilled in the Art, the invention is not considered limited thereto.

What I claim as my invention is:

1. A process for the production of a substantially iron free alumina-silica product from the group of raw materials consisting of kaolinitic clays and bauxites wherein said kaolinitic clays contain at least kaolinite with the chemical analysis of Al$_2$O$_3$.2SiO$_2$.2H$_2$O and said bauxites contain at least one of the minerals with the chemical analysis of Al$_2$O$_3$.xH$_2$O and at least one silica mineral from the group consisting of Al$_2$O$_3$.2SiO$_2$.2H$_2$O and SiO$_2$ and said group of raw materials contain at least iron as iron mineral, the said process comprising:
   (a) subjecting the said prepared materials to a calcining stage wherein the said materials are heated to within the temperature range of 625° C. to about 1150° C. to remove free moisture and water of crystallization combined in said minerals contained in the said materials and to convert said aluminous and siliceous minerals to alumina and silica thus producing a solids alumina-silica iron containing calcined solids product; and
   (b) subsequently subjecting the said calcined solids product to at least one chlorination stage wherein the said chlorination stage is carried out in the presence of starvation amounts of at least one chlorination agent selected from the group consisting of Cl$_2$, HCl and COCl$_2$ and at least one clorination agent selected from the group consisting of AlCl$_3$ and SiCl$_4$ and in the presence of at least CO and in the temperature range of about 850° C. to 1150° C. to produce a chlorinated alumina-silica product substantially free of said iron.

2. A process for the production of a substantially iron free aluminum chloride product from aluminous and siliceous minerals containing prepared materials, said materials consisting of iron minerals containing Bauxites and Kaolinitic Clays comprising:
   (a) Subjecting the said prepared materials to a calcining stage wherein the said materials are heated to within the temperature range of 625° C. to about 1150° C. to remove free moisture and water of crystallization combined in said minerals contained in the said materials and to convert said aluminous and siliceous minerals to alumina and silica thus producing a solids alumina-silica iron containing calcined solids product;
   (b) Subsequently subjecting the said calcined solids product to at least one chlorination stage wherein the said chlorination stage is carried out in the presence of starvation amounts of at least one chlorination agent selected from the group consisting of Cl$_2$, HCl and COCl$_2$ and at least one chlorination agent selected from the group consisting of AlCl$_3$ and SiCl$_4$ and in the presence of at least CO and in the temperature range of about 850° C. to 1150° C. to produce a chlorinated alumina silica product substantially free of said iron; and
   (c) Subsequently subjecting the said substantially iron free alumina-silica product to a further chlorination stage wherein the said chlorination agent is selected from the group consisting of Cl$_2$ and COCl$_2$ and in the presence of reducing agent selected from the group consisting of C. and CO. and in the temperature range of about 750° C. to 1150° C. to chlorinate the said alumina to subsequently produce an aluminum chloride product substantially free of said iron.

3. The process of claims 1 or 2 wherein the said chlorination agent selected from the group consisting of Cl$_2$, HCl, and COCl$_2$ is Cl$_2$ and HCl.

4. The process of claims 1 or 2 wherein the said chlorination agent selected from the group consisting of Cl$_2$, HCl, and COCl$_2$ is COCl$_2$ and HCl.

5. The process of claims 1 or 2 wherein the said chlorination agent selected from the group consisting of Cl$_2$, HCl, and COCl$_2$ is HCl.

6. The process of claims 1 or 2 wherein the said chlorination agent selected from the group consisting of Cl$_2$, HCl, and COCl$_2$ is Cl$_2$.

7. The process of claims 1 or 2 wherein the said chlorination agent selected from the group consisting of Cl$_2$, HCl, and COCl$_2$ is COCl$_2$.

8. The process of claims 1 or 2 wherein the said chlorination agent selected from the group consisting of AlCl$_3$ and SiCl$_4$ is AlCl$_3$.

9. The process of claims 1 or 2 wherein the said chlorination agent selected from the group consisting of AlCl$_3$ and SiCl$_4$ is SiCl$_4$.

10. The process of claims 1 or 2 wherein the said chlorination agent selected from the group consisting of AlCl$_3$ and SiCl$_4$ is AlCl$_3$ and SiCl$_4$.

* * * * *